United States Patent
Hashimoto et al.

(10) Patent No.: US 12,308,669 B2
(45) Date of Patent: May 20, 2025

(54) CONTROL DEVICE FOR POWER FEEDING DURING TRAVELING

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Shogo Tsuge, Fuji (JP); Ryosuke Ikemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 18/544,692

(22) Filed: Dec. 19, 2023

(65) Prior Publication Data

US 2024/0258841 A1   Aug. 1, 2024

(30) Foreign Application Priority Data

Jan. 31, 2023   (JP) ................ 2023-013398

(51) Int. Cl.
*H02J 50/80* (2016.01)
*B60L 53/124* (2019.01)
*H02J 50/60* (2016.01)

(52) U.S. Cl.
CPC ............ *H02J 50/80* (2016.02); *B60L 53/124* (2019.02); *H02J 50/60* (2016.02)

(58) Field of Classification Search
CPC .... H02J 50/80; H02J 50/60; H02J 7/00; H02J 7/00045; H02J 50/10; H02J 50/12; H02J 50/90; B60L 53/124; B60L 53/126; B60L 53/65; B60L 53/12; B60L 53/122; B60L 53/30; B60L 53/60; Y02T 10/70; Y02T 10/7072

See application file for complete search history.

(56) References Cited

U.S. PATENT DOCUMENTS

| | | | | |
|---|---|---|---|---|
| 2015/0278038 | A1* | 10/2015 | Halker | H02J 50/90 714/3 |
| 2015/0324798 | A1* | 11/2015 | Kai | G06Q 20/145 705/40 |
| 2016/0046194 | A1* | 2/2016 | Tsukamoto | B60L 53/124 307/104 |
| 2020/0047623 | A1* | 2/2020 | Zadrozny | H02J 50/90 |
| 2021/0009000 | A1* | 1/2021 | Moriya | B60L 50/64 |

FOREIGN PATENT DOCUMENTS

| | | |
|---|---|---|
| JP | 2012-257404 A | 12/2012 |
| JP | 2015-008551 A | 1/2015 |

* cited by examiner

*Primary Examiner* — Lincoln D Donovan
*Assistant Examiner* — Alex W Lam
(74) *Attorney, Agent, or Firm* — Dinsmore & Shohl LLP (57) ABSTRACT

A control device for power feeding during traveling includes a processor. Further, when a living object or a metal foreign object is detected around a primary coil of a power transfer device that transfers power to a power reception device of a vehicle that is traveling, the processor deletes identification information on the primary coil registered in an identification information list of the primary coil, and when the living object or the metal foreign object is not detected, the processor performs compatibility check and service authentication between the power reception device of the vehicle and the power transfer device.

3 Claims, 8 Drawing Sheets

CONTROL DEVICE FOR POWER FEEDING DURING TRAVELING

CROSS-REFERENCE TO RELATED APPLICATION(S)

The present application claims priority to and incorporates by reference the entire contents of Japanese Patent Application No. 2023-013398 filed in Japan on Jan. 31, 2023.

BACKGROUND

The present disclosure relates to a control device.

Japanese Laid-open Patent Publication No. 2015-008551 discloses a power feeding device including: a substrate; a primary coil that is arranged on the substrate and that generates a magnetic flux by AC; a cover attached to the substrate and covering the primary coil; a foreign object detector that detects an object on the cover; and a monitor that monitors the foreign object detector.

SUMMARY

There is a need for providing a control device for power feeding during traveling, which can cope with a case where a living object or a metal foreign object is detected.

According to an embodiment, a control device for power feeding during traveling includes a processor. Further, when a living object or a metal foreign object is detected around a primary coil of a power transfer device that transfers power to a power reception device of a vehicle that is traveling, the processor deletes identification information on the primary coil registered in an identification information list of the primary coil, and when the living object or the metal foreign object is not detected, the processor performs compatibility check and service authentication between the power reception device of the vehicle and the power transfer device.

DETAILED DESCRIPTION

In the technique disclosed in Japanese Laid-open Patent Publication No. 2015-008551, how to cope with a case where a living object or a metal foreign object is detected on a power feeding lane is not considered. The technique thus has room for improvement.

A control device for power feeding during traveling according to an embodiment of the present disclosure will be described with reference to the drawings. Note that components in the following embodiment include those that can be easily replaced by those skilled in the art or those that are substantially the same.

Wireless Power Transfer System

A wireless power transfer system to which the control device for power feeding during traveling according to the embodiment is applied will be described with reference to FIGS. 1 to 8.

Figure 1:
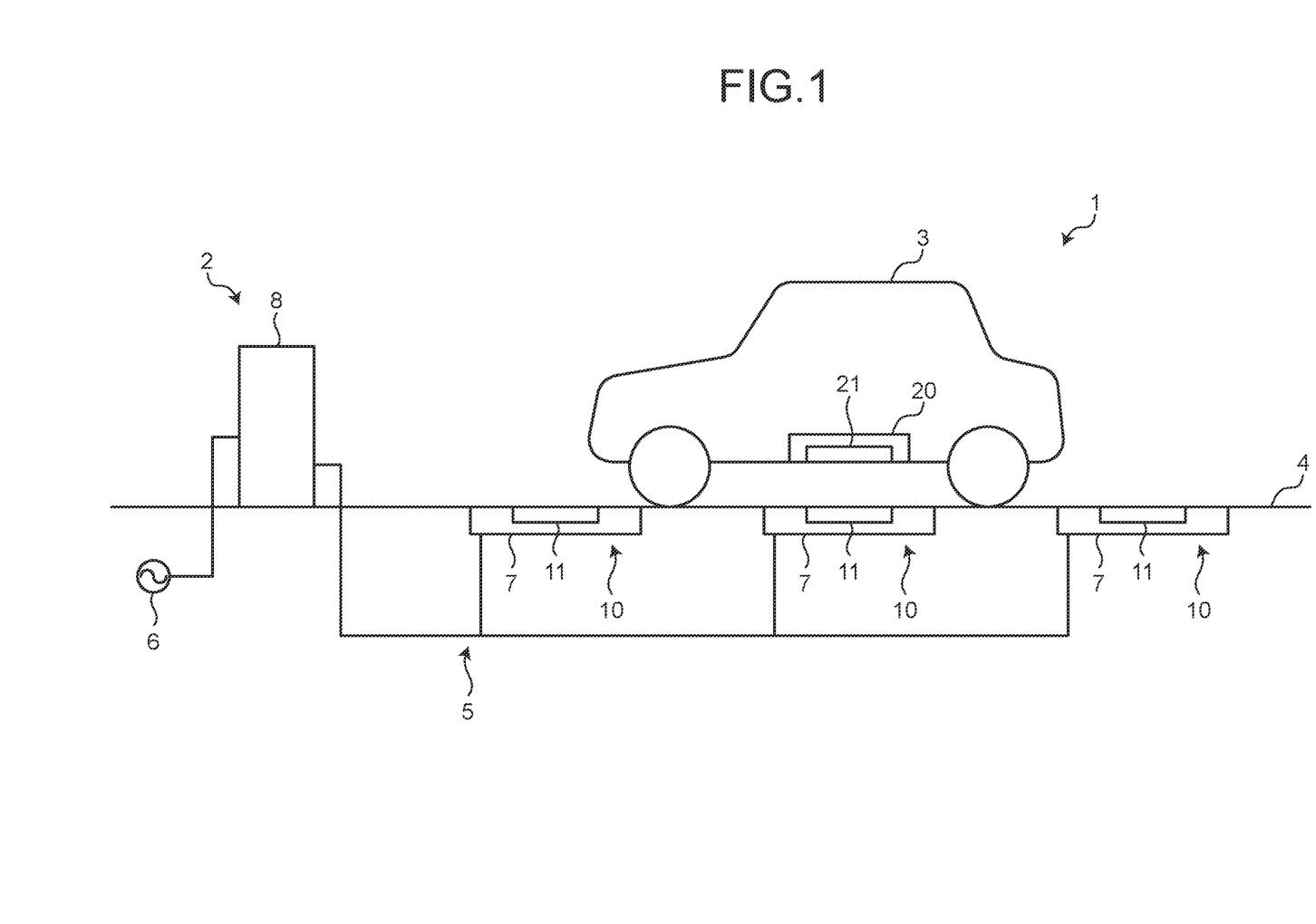
FIG. 1 is a schematic diagram illustrating a wireless power transfer system to which a control device for power feeding during traveling according to an embodiment is applied.

FIG. 1 is a schematic diagram illustrating the wireless power transfer system in the embodiment. A wireless power transfer system 1 includes a feed facility 2 and a vehicle 3. The feed facility 2 feeds power to the traveling vehicle 3 in a non-contact manner. The vehicle 3 is an electric vehicle that can be charged with power fed from an external power source, and includes, for example, a battery electric vehicle (BEV) and a plug-in hybrid electric vehicle (PHEV).

The wireless power transfer system 1 performs wireless power transfer from the feed facility 2 to the vehicle 3 by magnetic field resonance coupling (magnetic field resonance). The wireless power transfer system 1 transfers power from the feed facility 2 to the vehicle 3 traveling on a road 4 in a non-contact manner. That is, the wireless power transfer system 1 transfers power by a magnetic field resonance method, and achieves power feeding during traveling to the vehicle 3 by using the magnetic field resonance coupling (magnetic field resonance). The wireless power transfer system 1 can also be expressed as a dynamic wireless power transfer (D-WPT) system or a magnetic field dynamic wireless power transfer (MF-D-WPT) system.

The feed facility 2 includes a feed device 5 and an AC power source 6 that feeds power to the feed device 5. The feed device 5 transfers the power fed from the AC power source 6 to the vehicle 3 in a non-contact manner. The AC power source 6 is, for example, a commercial power source. The feed device 5 includes a power transfer device 10 including a primary coil 11.

The feed device 5 includes a segment 7 and a management device 8. The segment 7 includes the primary coil 11. The management device 8 manages the segment 7. The segment 7 is embedded in a lane of the road 4. The management device 8 is installed beside the road 4. The segment 7 is electrically connected to the management device 8. The management device 8 is electrically connected to the AC power source 6, and feeds power of the AC power source 6 to the segment 7. The segment 7 is electrically connected to the AC power source 6 via the management device 8. A plurality of the segments 7 can be arranged along the lane of the road 4. For example, as illustrated in FIG. 1, the feed device 5 includes three segments 7 and one management device 8. The three segments 7 are installed side by side along the lane in the road 4. The three segments 7 are connected to the one management device 8. The segment 7 has a function of transferring power from the feed device 5 to the vehicle 3 in a non-contact manner. The management device 8 has a function of controlling wireless power transfer in the segment 7.

The vehicle 3 includes a power reception device 20 including a secondary coil 21. The power reception device 20 is provided at the bottom of the body of the vehicle 3. When the vehicle 3 travels on the road 4 on which the primary coil 11 is installed, the primary coil 11 on the ground side and the secondary coil 21 on the vehicle side vertically face each other. The wireless power transfer system 1 transfers power from the primary coil 11 of the power transfer device 10 to the secondary coil 21 of the power reception device 20 in a non-contact manner while the vehicle 3 is traveling on the road 4.

In this description, traveling means a state in which the vehicle 3 is located on the road 4 for traveling. The traveling includes a state in which the vehicle 3 is temporarily stopped on the road 4. For example, the traveling also includes a state in which the vehicle 3 is stopped on the road 4 for waiting for a traffic light, for example. In contrast, the traveling does not include a case where, for example, the vehicle 3 is parked even in a state in which the vehicle 3 is located on the road 4.

Furthermore, in this description, a lane in which the primary coil 11 (segment 7) is embedded may be referred to as a D-WPT lane, and a partial section of the road 4 in which the feed device 5 can perform the wireless power transfer may be referred to as a D-WPT charging site. In the D-WPT lane and the D-WPT charging site, a plurality of primary coils 11 (plurality of segments 7) is installed side by side in a traveling direction of the vehicle 3 over a predetermined section of the road 4.

Figure 2:
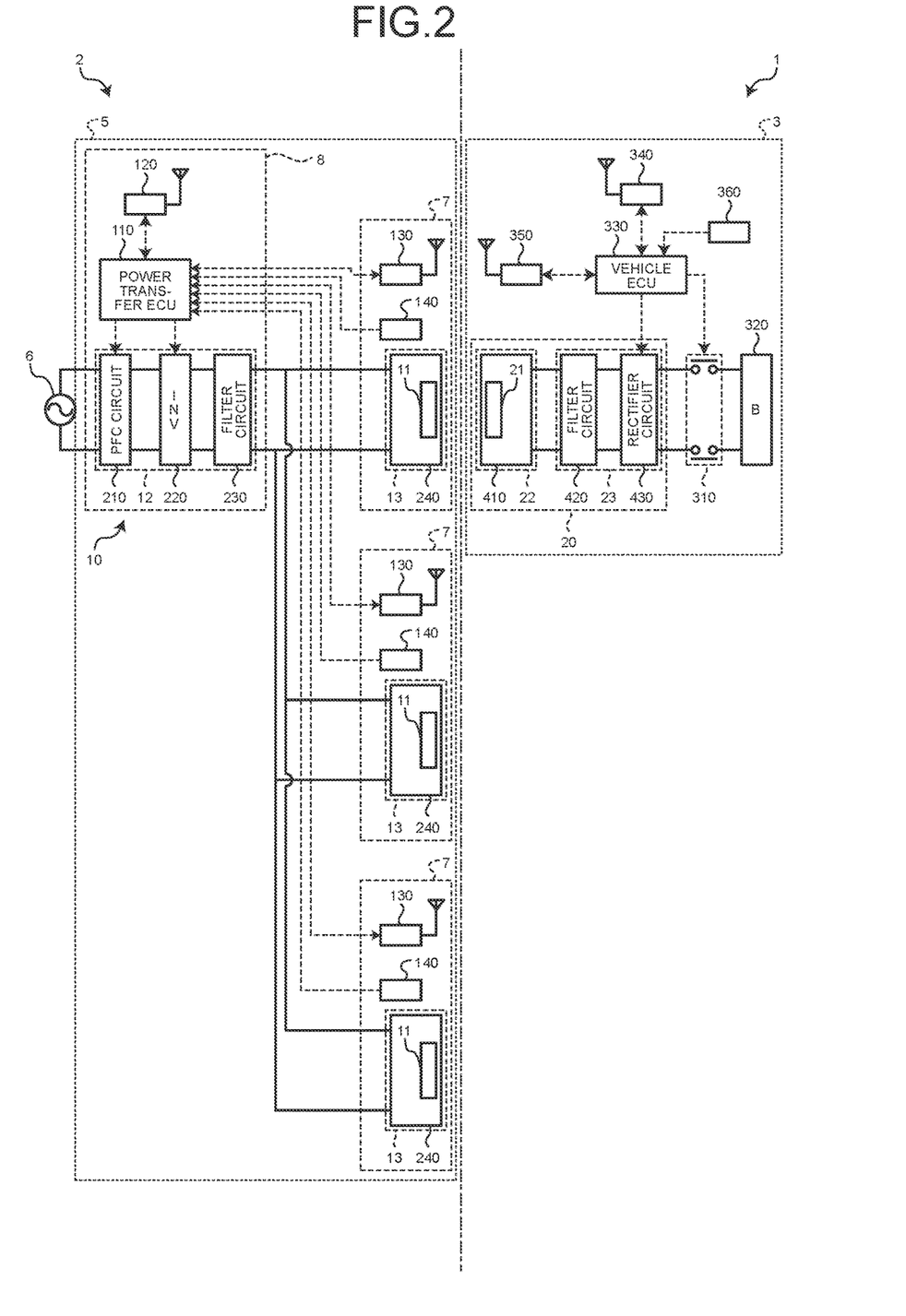
FIG. 2 illustrates an overall configuration of the wireless power transfer system.

FIG. 2 illustrates an overall configuration of the wireless power transfer system. In the feed facility 2, the feed device 5 and the AC power source 6 are electrically connected with each other. In the feed device 5, the segment 7 and the management device 8 are electrically connected with each other.

The feed device 5 includes configurations provided in the management device 8 and configurations provided in the segment 7. The feed device 5 includes the power transfer device 10, a power transfer electronic control unit (ECU) 110, a first communication device 120, a second communication device 130, and a foreign object detection device 140.

The power transfer device 10 includes an electric circuit connected to the AC power source 6. The power transfer device 10 includes a power factor collection (PFC) circuit 210, an inverter (INV) 220, a filter circuit 230, and a power-transfer-side resonance circuit 240.

The PFC circuit 210 improves the power factor of AC power input from the AC power source 6, converts the AC power into DC power, and outputs the DC power to the inverter 220. The PFC circuit 210 includes an AC/DC converter. The PFC circuit 210 is electrically connected to the AC power source 6.

The inverter 220 converts the DC power input from the PFC circuit 210 into AC power. Each switching element of the inverter 220 includes an insulated gate bipolar transistor (IGBT) and a metal-oxide-semiconductor field effect transistor (MOSFET), and performs a switching operation in accordance with a control signal from the power transfer ECU 110. For example, the operating frequency of the inverter 220 is 85 kHz. The inverter 220 outputs the AC power as a result of the conversion to the filter circuit 230.

The filter circuit 230 removes noise included in the AC input from the inverter 220, and feeds the AC power from which the noise has been removed to the power-transfer-side resonance circuit 240. The filter circuit 230 is an LC filter obtained by combining a coil and a capacitor. For example, the filter circuit 230 includes a T-type filter in which two coils and one capacitor are arranged in a T-shape. The PFC circuit 210, the inverter 220, and the filter circuit 230 constitute a power converter 12 of the power transfer device 10.

The power-transfer-side resonance circuit 240 is a power transfer unit that transfers the AC power fed from the filter circuit 230 to the power reception device 20 in a non-contact manner. When AC power is fed from the filter circuit 230 to the power-transfer-side resonance circuit 240, current flows through the primary coil 11, and a magnetic field for power transfer is generated.

The power-transfer-side resonance circuit 240 includes the primary coil 11 and a resonance capacitor. The primary coil 11 is a power transfer coil. The resonance capacitor is connected in series to one end of the primary coil 11, and adjusts a resonance frequency of the power-transfer-side resonance circuit 240. In some embodiments, the resonance frequency is 10 kHz to 100 GHz, or 85 kHz. For example, the power transfer device 10 is configured such that the resonance frequency of the power-transfer-side resonance circuit 240 coincides with the operating frequency of the inverter 220. The power-transfer-side resonance circuit 240 constitutes a primary device 13 of the power transfer device 10.

The power transfer device 10 includes the power converter 12 and the primary device 13. The power converter 12 includes the PFC circuit 210, the inverter 220, and the filter circuit 230. The primary device 13 includes the power-transfer-side resonance circuit 240. The power transfer device 10 has a configuration in which the power converter 12 is provided in the management device 8 and the primary device 13 is provided in the segment 7.

In the feed device 5, the power converter 12 of the power transfer device 10, the power transfer ECU 110, and the first communication device 120 are provided in the management device 8, and the primary device 13 of the power transfer device 10, the second communication device 130, and the foreign object detection device 140 are provided in the segment 7.

The power transfer ECU 110 is an electronic control device that controls the feed device 5. The power transfer ECU 110 includes a processor and a memory. The processor includes a central processing unit (CPU), a digital signal processor (DSP), and a field-programmable gate array (FPGA). The memory is a main storage device, and includes a random access memory (RAM) and a read only memory (ROM). The power transfer ECU 110 loads a program stored in a storage into a work area of the memory (main storage device), and executes the program. The power transfer ECU 110 implements a function that matches a predetermined purpose by controlling each component and the like through the execution of the program. The storage includes recording media such as an erasable programmable ROM (EPROM), a hard disk drive (HDD), and a removable medium. Examples of the removable medium include disc recording media such as a universal serial bus (USB) memory, a compact disc (CD), a digital versatile disc (DVD), and a Blu-ray (registered trademark) disc (BD). The storage can store an operating system (OS), various programs, various tables, various databases, and the like. Signals from various sensors are input to the power transfer ECU 110. A signal from the foreign object detection device 140 is input to the power transfer ECU 110. Then, the power transfer ECU 110 executes various controls based on the signals input from the various sensors.

For example, the power transfer ECU 110 executes power control for adjusting power for transfer. In the power control, the power transfer ECU 110 controls the power transfer device 10. The power transfer ECU 110 outputs a control signal to the power converter 12 for controlling the power fed from the power converter 12 to the primary device 13.

The power transfer ECU 110 controls switching elements included in the PFC circuit 210 to adjust the power for transfer, and controls switching elements included in the inverter 220 to adjust the power for transfer.

Furthermore, the power transfer ECU 110 executes communication control for controlling communication with the vehicle 3. In the communication control, the power transfer ECU 110 controls the first communication device 120 and the second communication device 130.

The first communication device 120 is provided on the ground side, and performs wide-area wireless communication. The first communication device 120 performs wireless communication with a vehicle 3 before approaching a WPT lane among vehicles 3 traveling on the road 4. The state before approaching the WPT lane means that the vehicle 3 is located at a position where the vehicle 3 cannot perform narrow-area wireless communication with the feed device 5.

In the wide-area wireless communication, a communication distance is set to 10 meters to 10 kilometers. In the wide-area wireless communication, the communication distance is longer than that of the narrow-area wireless communication. Various wireless communications with a long communication distance can be used as the wide-area wireless communication. For example, communication conforming to a communication standard such as 3GPP (registered trademark), 4G formulated by IEEE, LTE, 5G, and WiMAX is used for the wide-area wireless communication. In the wireless power transfer system 1, vehicle information associated with vehicle identification information (vehicle ID) is transferred from the vehicle 3 to the feed device 5 by using the wide-area wireless communication.

The second communication device 130 is provided on the ground side, and performs narrow-area wireless communication. The second communication device 130 performs wireless communication with a vehicle 3 that has approached or entered the WPT lane among the vehicles 3 traveling on the road 4. The state of approaching the WPT lane means that the vehicle 3 is located at a position where the vehicle 3 can perform narrow-area wireless communication with the feed device 5.

In the narrow-area wireless communication, a communication distance is set to less than 10 meters. In the narrow-area wireless communication, the communication distance is shorter than that of the wide-area wireless communication. Various near field communications with a short communication distance can be used as the narrow-area wireless communication. For example, communication conforming to any communication standard formulated by IEEE, ISO, and IEC is used for the narrow-area wireless communication. In one example, the Wi-Fi (registered trademark), the Bluetooth (registered trademark), and the ZigBee (registered trademark) are used for the narrow-area wireless communication. Alternatively, the radio frequency identification (RFID), dedicated short range communication (DSRC), and the like may be used as techniques for performing the narrow-area wireless communication. In the wireless power transfer system 1, vehicle identification information and the like are transferred from the vehicle 3 to the feed device 5 by using the narrow-area wireless communication.

The foreign object detection device 140 detects a metal foreign object, a living object, and the like existing above the primary coil 11. The foreign object detection device 140 includes, for example, a sensor coil and an imaging device, which are installed on the ground. The foreign object detection device 140 exerts a foreign object detection (FOD) function and a living object protection (LOP) function in the wireless power transfer system 1.

In the feed device 5, the configurations of the power transfer device 10 are divided into those arranged in the segment 7 and those arranged in the management device 8, and three segments 7 are connected to one management device 8. In the power transfer device 10, one inverter feeds power to three power-transfer-side resonance circuit 240. Furthermore, in the feed device 5, a signal from each segment 7 is input to the management device 8. Signals from the second communication device 130 and a foreign object detection device 14, which are provided in a first segment, are input to the power transfer ECU 110. Similarly, signals from a second communication device 130 and a foreign object detection device 14, which are provided in a second segment, are input to the power transfer ECU 110. Signals from a second communication device 130 and a foreign object detection device 14, which are provided in a third segment, are input to the power transfer ECU 110. The power transfer ECU 110 can grasp the state of each segment 7 based on the signals input from each segment 7.

The vehicle 3 includes the power reception device 20, a charging relay 310, a battery 320, a vehicle ECU 330, a third communication device 340, a fourth communication device 350, and a global positioning system (GPS) receiver 360.

The power reception device 20 feeds power received from the power transfer device 10 to the battery 320. The power reception device 20 is electrically connected to the battery 320 via the charging relay 310. The power reception device 20 includes a power-reception-side resonance circuit 410, a filter circuit 420, and a rectifier circuit 430.

The power-reception-side resonance circuit 410 is a power receiver that receives power transferred from the power transfer device 10 in a non-contact manner. The power-reception-side resonance circuit 410 includes a power-reception-side resonance circuit including the secondary coil 21 and a resonance capacitor. The secondary coil 21 is a power reception coil that receives power transferred from the primary coil 11 in a non-contact manner. The resonance capacitor is connected in series to one end of the secondary coil 21, and adjusts the resonance frequency of the power-reception-side resonance circuit. The resonance frequency of the power-reception-side resonance circuit 410 is determined so as to coincide with the resonance frequency of the power-transfer-side resonance circuit 240.

The power-reception-side resonance circuit 410 has the same resonance frequency as the resonance frequency of the power-transfer-side resonance circuit 240. Thus, when a magnetic field is generated by the power-transfer-side resonance circuit 240 with the power-reception-side resonance circuit 410 facing the power-transfer-side resonance circuit 240, vibration of the magnetic field is transferred to the power-reception-side resonance circuit 410. The primary coil 11 and the secondary coil 21 resonate with each other. When induced current flows through the secondary coil 21 by electromagnetic induction, induced electromotive force is generated in the power-reception-side resonance circuit 410. As described above, the power-reception-side resonance circuit 410 receives the power transferred from the power-transfer-side resonance circuit 240 in a non-contact manner. Then, the power-reception-side resonance circuit 410 feeds the power received from the power-transfer-side resonance circuit 240 to the filter circuit 420. The power-reception-side resonance circuit 410 constitutes a secondary device 22 of the power reception device 20.

The filter circuit 420 removes noise included in the AC input from the power-reception-side resonance circuit 410, and outputs the AC power from which the noise has been removed to the rectifier circuit 430. The filter circuit 420 is an LC filter obtained by combining a coil and a capacitor. For example, the filter circuit 420 includes a T-type filter in which two coils and one capacitor are arranged in a T-shape.

The rectifier circuit 430 converts the AC power input from the filter circuit 420 into DC power, and outputs the DC power to the battery 320. The rectifier circuit 430 is configured as a full-bridge circuit in which four diodes are connected in a full-bridge manner as rectifier elements, for example. A switching element is connected in parallel to each diode of the rectifier circuit 430. Each switching element of the rectifier circuit 430 includes an IGBT, and performs a switching operation in accordance with a control signal from the vehicle ECU 330. The rectifier circuit 430 feeds the DC power as a result of conversion to the battery 320. The filter circuit 420 and the rectifier circuit 430 constitute a power converter 23 of the power reception device 20.

The power reception device 20 includes the secondary device 22 and the power converter 23. The secondary device 22 includes the power-reception-side resonance circuit 410. The power converter 23 includes the filter circuit 420 and the rectifier circuit 430.

The charging relay 310 is provided between the rectifier circuit 430 and the battery 320. The vehicle ECU 330 controls the open/closed state of the charging relay 310. The charging relay 310 is controlled to be in a closed state when the power transfer device 10 charges the battery 320. When the charging relay 310 is in the closed state, the rectifier circuit 430 and the battery 320 are connected so as to be energized. When the charging relay 310 is in the open state, the rectifier circuit 430 and the battery 320 are disconnected so as not to be energized. For example, when the charging relay 310 is in the open state, the vehicle 3 does not make a request for power feeding.

The battery 320 is a DC power source that can be charged, and includes, for example, a lithium-ion battery and a nickel hydrogen battery. The battery 320 stores power fed from the power transfer device 10 to the power reception device 20. Furthermore, the battery 320 can feed power to a traveling motor of the vehicle 3. The battery 320 is electrically connected to the traveling motor via a power control unit (PCU). The PCU is a power conversion device that converts DC power of the battery 320 into AC power to feed the AC power to the traveling motor. Each switching element of the PCU includes an IGBT, and performs a switching operation in accordance with a control signal from the vehicle ECU 330.

The vehicle ECU 330 is an electronic control device that controls the vehicle 3. The vehicle ECU 330 has a hardware configuration similar to that of the power transfer ECU 110. Signals from various sensors mounted on the vehicle 3 are input to the vehicle ECU 330. Furthermore, a positioning signal received by the GPS receiver 360 is input to the vehicle ECU 330. The vehicle ECU 330 can acquire information on the current position of the vehicle 3 from the GPS receiver 360. Then, the vehicle ECU 330 executes various controls based on the signals input from the various sensors.

For example, the vehicle ECU 330 transfers power from the primary coil 11 to the secondary coil 21 in a non-contact manner, and executes non-contact charging control of storing power received by the secondary coil 21 in the battery 320. In the non-contact charging control, the vehicle ECU 330 controls the rectifier circuit 430, the charging relay 310, the third communication device 340, and the fourth communication device 350. The non-contact charging control includes power control and communication control. In the power control, charging power is controlled. In the communication control, communication with the feed device 5 is controlled. In the power control, the vehicle ECU 330 controls a switching element included in the rectifier circuit 430, and adjusts power (charging power) fed from the power reception device 20 to the battery 320. In the communication control, the vehicle ECU 330 controls the third communication device 340 and the fourth communication device 350.

The third communication device 340 is provided on the vehicle side, and performs the wide-area wireless communication. The third communication device 340 performs wireless communication with the first communication device 120 of the feed device 5 in a state before the vehicle 3 traveling on the road 4 approaches the WPT lane. The wide-area wireless communication is bidirectional wireless communication. High-speed wireless communication is performed between the first communication device 120 and the third communication device 340.

The fourth communication device 350 is provided on the vehicle side, and performs the narrow-area wireless communication. The fourth communication device 350 performs wireless communication with the second communication device 130 of the feed device 5 in a state where the vehicle 3 has approached or entered the WPT lane. The narrow-area wireless communication is unidirectional wireless signaling. The unidirectional wireless signaling is point to point signaling (P2PS). The P2PS is used for the vehicle 3 to notify the feed device 5 of vehicle identification information in activities of Pairing, Alignment check, Magnetic Coupling Check, and Power transfer terminated. Furthermore, the P2PS can be used as a technique of Alignment check in a lateral direction. The lateral direction is a direction of the width of the lane, and is a direction of the width of the vehicle 3.

The GPS receiver 360 detects the current position of the vehicle 3 based on positioning information obtained from a plurality of positioning satellites. The information on the current position of the vehicle 3 detected by the GPS receiver 360 is transferred to the vehicle ECU 330.

Note that, in the feed device 5, the filter circuit 230 may be included not in the segment 7 but in the management device 8. That is, the filter circuit 230 may be installed beside the road 4. In this case, the power converter 12 includes the PFC circuit 210, the inverter 220, and the filter circuit 230. The primary device 13 includes the power-transfer-side resonance circuit 240.

Furthermore, the filter circuit 230 may be individually provided in each primary coil 11, or may be provided over the plurality of primary coils 11.

Furthermore, the filter circuit 230 is not limited to the T-type filter. The filter circuit 230 may be, for example, a bandpass filter in which a coil and a capacitor are connected in series. The same applies to the filter circuit 420 of the vehicle 3.

Furthermore, in the power transfer device 10, a changeover switch for switching the primary coil 11 to be energized may be provided in each of the primary devices 13 when the inverter 220 is connected to the plurality of primary coils 11. The changeover switch may be provided in the management device 8 beside the road 4, or may be provided near the primary coil 11.

Furthermore, the power-transfer-side resonance circuit 240 is not limited to the configuration in which the primary coil 11 and the resonance capacitor are connected in series. The primary coil 11 and the resonance capacitor may be connected in parallel, or may be connected in combination of both in parallel and in series. In short, the power-transfer-side resonance circuit 240 is only required to be configured such that the resonance frequency of the power-transfer-side resonance circuit 240 coincides with the operating frequency of the inverter 220, and the connection relation between components thereof is not particularly limited. The same applies to the power-reception-side resonance circuit 410 of the vehicle 3.

Furthermore, the operating frequency of the inverter 220 is not limited to 85 kHz, but may be around 85 kHz. In short, the operating frequency of the inverter 220 may be in a predetermined frequency band including 85 kHz.

Furthermore, in the power transfer device 10, a plurality of inverters 220 may be connected to an output-side power line (DC power line) of the PFC circuit 210.

Furthermore, the foreign object detection device 140 may be provided not only on the ground side but on the side of the vehicle 3. For example, when the foreign object detection device on the side of the vehicle 3 detects a foreign object, a living object, and the like existing above the primary coil 11, a request for power feeding may be stopped until the vehicle 3 passes through the primary coil 11.

Furthermore, in the wireless power transfer system 1, information transferred from the vehicle 3 to the feed device 5 by using the narrow-area wireless communication includes a request for power feeding and a fed power request value in addition to the vehicle identification information. The request for power feeding is information indicating a request for power transfer from the primary coil 11. The fed power request value is a request value of an amount of power transferred from the feed device 5 to the vehicle 3. The vehicle ECU 330 can calculate the fed power request value based on the SOC of the battery 320.

Furthermore, the wireless power transfer system 1 can achieve not only a method of power feeding from the ground to the vehicle 3 but a method of power feeding from the vehicle 3 to the ground. In this case, the rectifier circuit 430 can be replaced with an inverter to achieve power feeding and rectification at the time of power reception.

Figure 3:
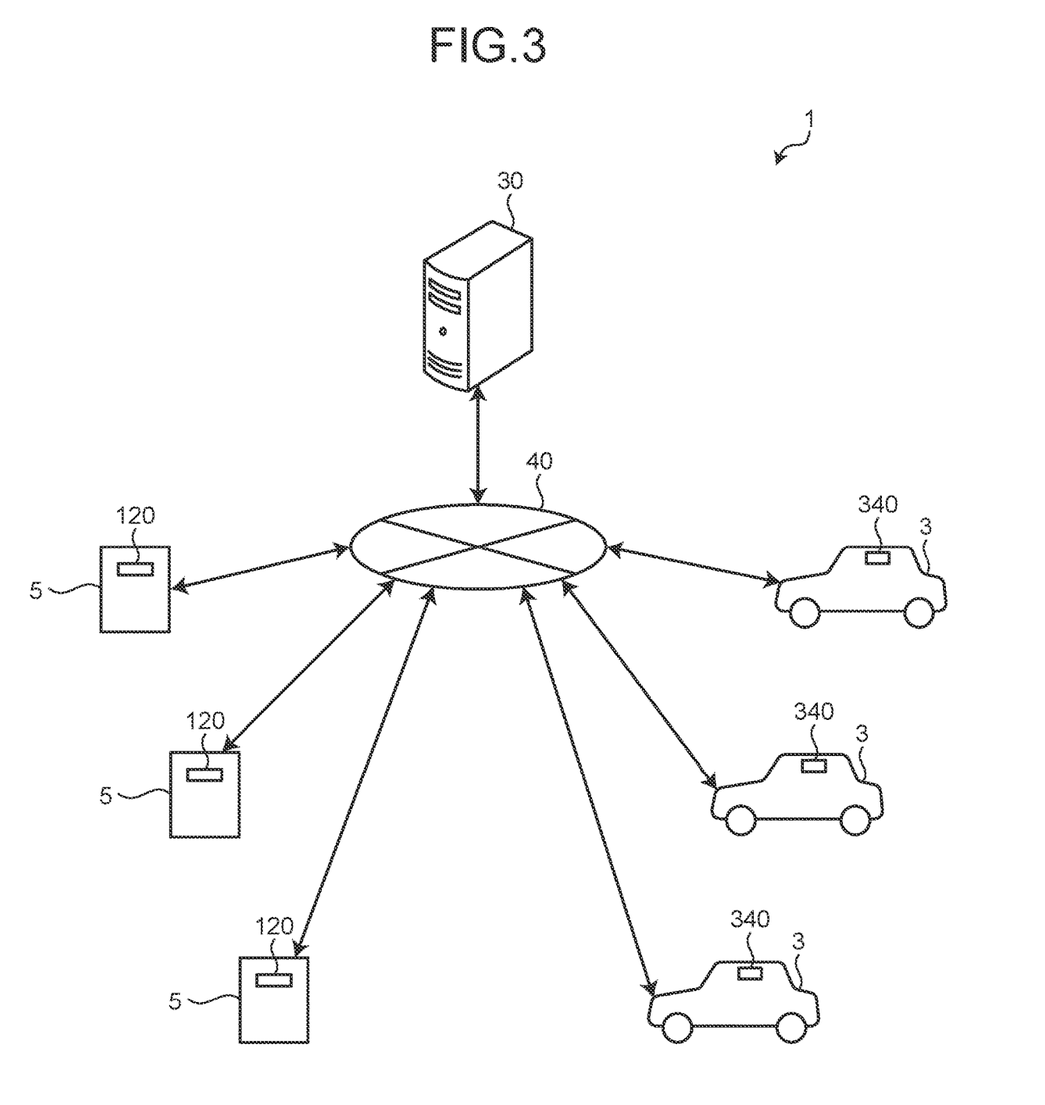
FIG. 3 is a schematic diagram illustrating wide-area wireless communication in the wireless power transfer system.

FIG. 3 is a schematic diagram illustrating the wide-area wireless communication in the wireless power transfer system.

In the wireless power transfer system 1, the vehicle 3 can communicate with a server 30, and the feed device 5 can communicate with the server 30. The server 30 is connected to a network 40, and can communicate with a plurality of vehicles 3 and a plurality of feed devices 5 via the network 40. The network 40 includes a wide area network (WAN), which is a public communication network such as the Internet, a telephone communication network for mobile phones, and the like.

The vehicle 3 is connected to the network 40 by the wide-area wireless communication using the third communication device 340. The vehicle 3 transfers information to the server 30, and receives information from the server 30.

The feed device 5 is connected to the network 40 by the wide-area wireless communication using the first communication device 120. The feed device 5 transfers information to the server 30, and receives information from the server 30.

Figure 4:
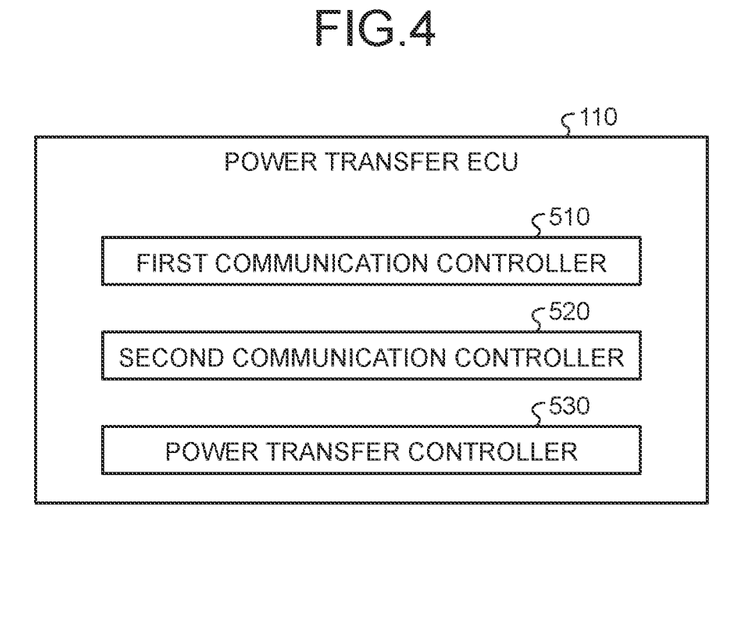
FIG. 4 is a block diagram illustrating a functional configuration of a power transfer ECU.

FIG. 4 is a block diagram illustrating a functional configuration of the power transfer ECU. The power transfer ECU 110 includes a first communication controller 510, a second communication controller 520, and a power transfer controller 530.

The first communication controller 510 executes first communication control for controlling the first communication device 120. In the first communication control, the wide-area wireless communication on the side of the feed device 5 is controlled, and communication of the feed device 5 using the first communication device 120 is controlled. That is, in the first communication control, communication of the management device 8 of the feed device 5 is controlled. In the first communication control, communication between the feed device 5 and the network 40 is controlled, and communication between the feed device 5 and the server 30 via the network 40 is controlled. The first communication controller 510 is a supply equipment communication controller (SECC).

The second communication controller 520 executes second communication control for controlling the second communication device 130. In the second communication control, the narrow-area wireless communication on the side of the feed device 5 is controlled, and communication of the feed device 5 using the second communication device 130 is controlled. That is, in the second communication control, communication of the segment 7 of the feed device 5 is controlled. In the second communication control serving as communication without the network 40, communication between the feed device 5 and the vehicle 3 is controlled. The second communication controller 520 is a primary device communication controller (PDCC).

The power transfer controller 530 executes power transfer control for controlling the power transfer device 10. In the power transfer control, power for transfer is controlled, and the power converter 12 of the power transfer device 10 is controlled. The power transfer controller 530 executes power control for controlling the PFC circuit 210 and the inverter 220.

Figure 5:
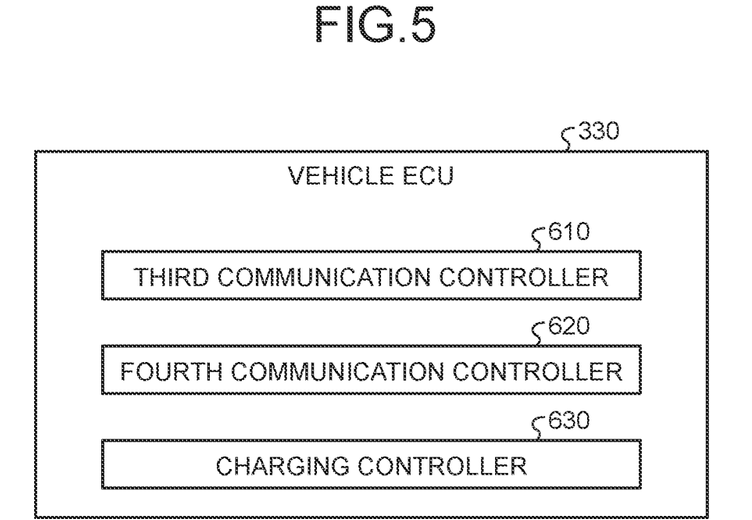
FIG. 5 is a block diagram illustrating a functional configuration of the vehicle ECU.

FIG. 5 is a block diagram illustrating a functional configuration of the vehicle ECU. The vehicle ECU 330 includes a third communication controller 610, a fourth communication controller 620, and a charging controller 630.

The third communication controller 610 executes third communication control for controlling the third communication device 340. In the third communication control, the wide-area wireless communication on the side of the vehicle 3 is controlled, and communication of the vehicle 3 using the third communication device 340 is controlled. In the third communication control, communication between the vehicle 3 and the network 40 is controlled, and communication between the vehicle 3 and the server 30 via the network 40 is controlled. The third communication controller 610 is an EV communication controller (EVCC).

The fourth communication controller 620 executes fourth communication control for controlling the fourth communication device 350. In the fourth communication control, the narrow-area wireless communication on the side of the vehicle 3 is controlled, and communication of the vehicle 3 using the fourth communication device 350 is controlled. In the fourth communication control serving as communication without the network 40, communication between the vehicle 3 and the feed device 5 is controlled. The fourth communication controller 620 is a secondary device communication controller (SDCC).

The charging controller 630 executes charging control for controlling the power reception device 20 and the charging relay 310. The charging control includes power control and relay control. In the power control, received power in the power reception device 20 is controlled. In the relay control, the state of connection between the secondary device 22 and the battery 320 is controlled. The charging controller 630 executes power control for controlling the rectifier circuit 430. The charging controller 630 executes relay control for switching the open/closed state of the charging relay 310.

In the wireless power transfer system 1 configured as described above, wireless power transfer from the feed device 5 to the vehicle 3 is performed with wireless communication being established between the vehicle 3 and the feed device 5. Power is transferred from the primary coil 11 on the ground side to the secondary coil 21 on the vehicle side in a non-contact manner with the vehicle 3 and the feed device 5 being paired by wireless communication. Then, charging control for feeding power received by the secondary coil 21 to the battery 320 is performed in the vehicle 3.

Next, a power transfer process (D-WPT process) will be described with reference to FIG. 6. The power transfer process is structured as a chain of a plurality of activities, and derived from a state and corresponding transition.

Figure 6:
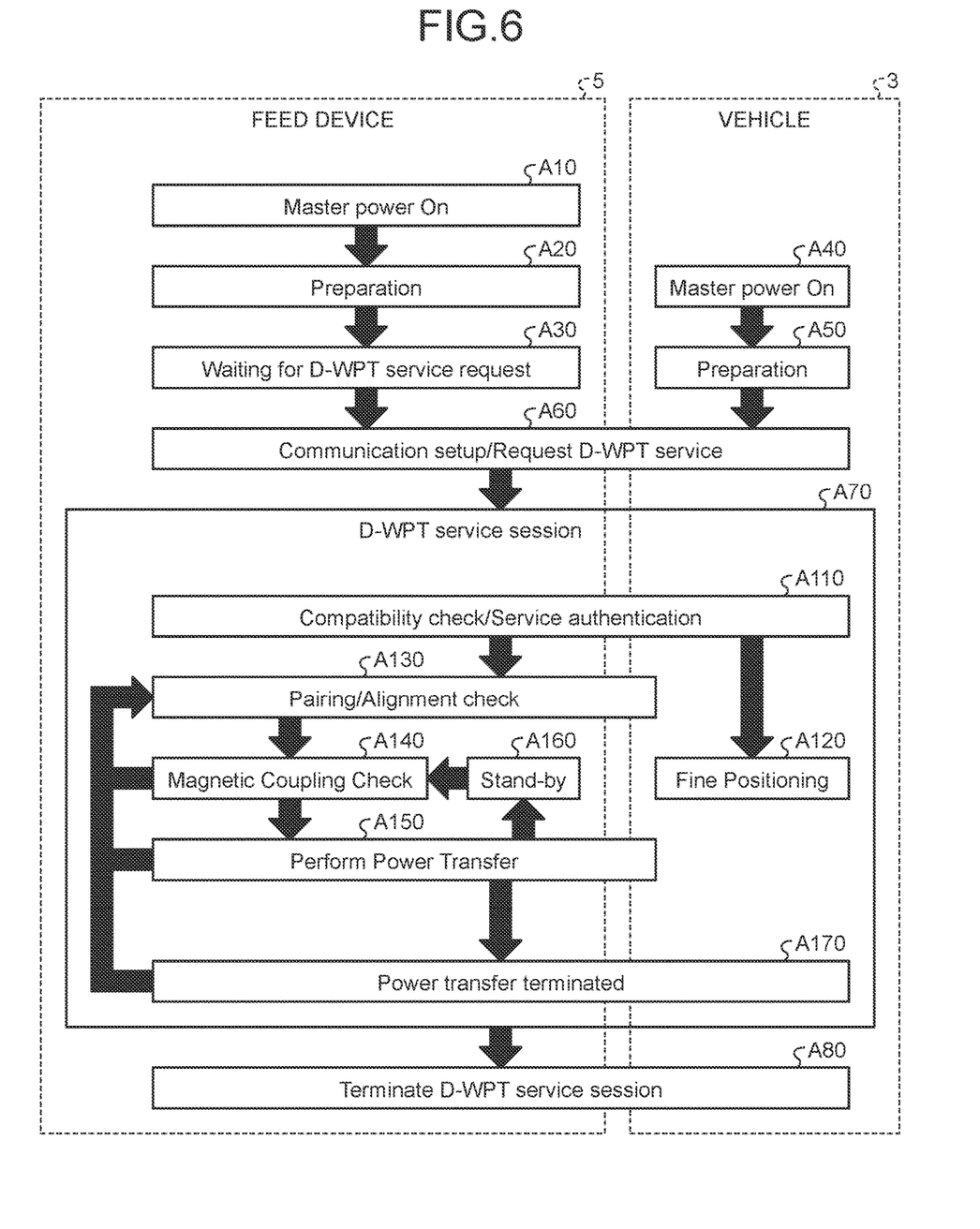
FIG. 6 illustrates a power transfer process.

FIG. 6 illustrates the power transfer process. FIG. 6 illustrates basic activities for describing the power transfer process. Thick arrows in FIG. 6 represent transition lines. The activities constituting the power transfer process represents the state of the wireless power transfer system 1 in the power transfer process.

The activities constituting the power transfer process include: a power transfer service session (D-WPT service session A70), which is an activity in a stage of power transfer; activities in a stage before the power transfer; and an activity in a stage after the power transfer. Furthermore, the activities can be described by dividing an operation subject thereof in accordance with the presence or absence of communication between the feed device 5 and the vehicle 3. The activities are divided into those representing the state of only the side of the feed device 5 without communication, those representing the state of only the side of the vehicle 3 without communication, and the states of both the feed device 5 and the vehicle 3 with communication.

As illustrated in FIG. 6, the activities include: Master power On A10; Preparation A20; Waiting for D-WPT service request A30; Master power On A40; Preparation A50; Communication setup/Request D-WPT service A60; D-WPT service session A70; and Terminate D-WPT service session A80.

The Preparation A20 is a preparation state of the feed device 5. In the Preparation A20, the feed device 5 activates a circuit and confirms safety without communicating with the vehicle 3. When the Master power On A10 is reached, the feed device 5 transitions to the state of Preparation A20. Then, when the feed device 5 can activate a circuit and confirm safety in the Preparation A20, the state transitions to the Waiting for D-WPT service request A30 from the vehicle 3. In contrast, when the feed device 5 has a problem, the feed device 5 notifies the vehicle 3 of information indicating that the wireless power transfer system 1 is unavailable (unavailability notification) by the wide-area wireless communication. The first communication device 120 transfers the unavailability notification to the vehicle 3.

The Preparation A50 is a preparation state of the vehicle 3. In the Preparation A50, the vehicle 3 activates a circuit and confirms safety without communicating with the feed device 5. When the Master power On A40 is reached, the vehicle 3 transitions to the state of Preparation A50. Then, when the vehicle 3 can activate the circuit and confirm safety in the Preparation A50, the state transitions to the Communication setup/Request D-WPT service A60. In contrast, when the vehicle 3 has a problem, the vehicle 3 does not start the wide-area wireless communication, and does not perform the subsequent sequence in the D-WPT process.

Figure 7:
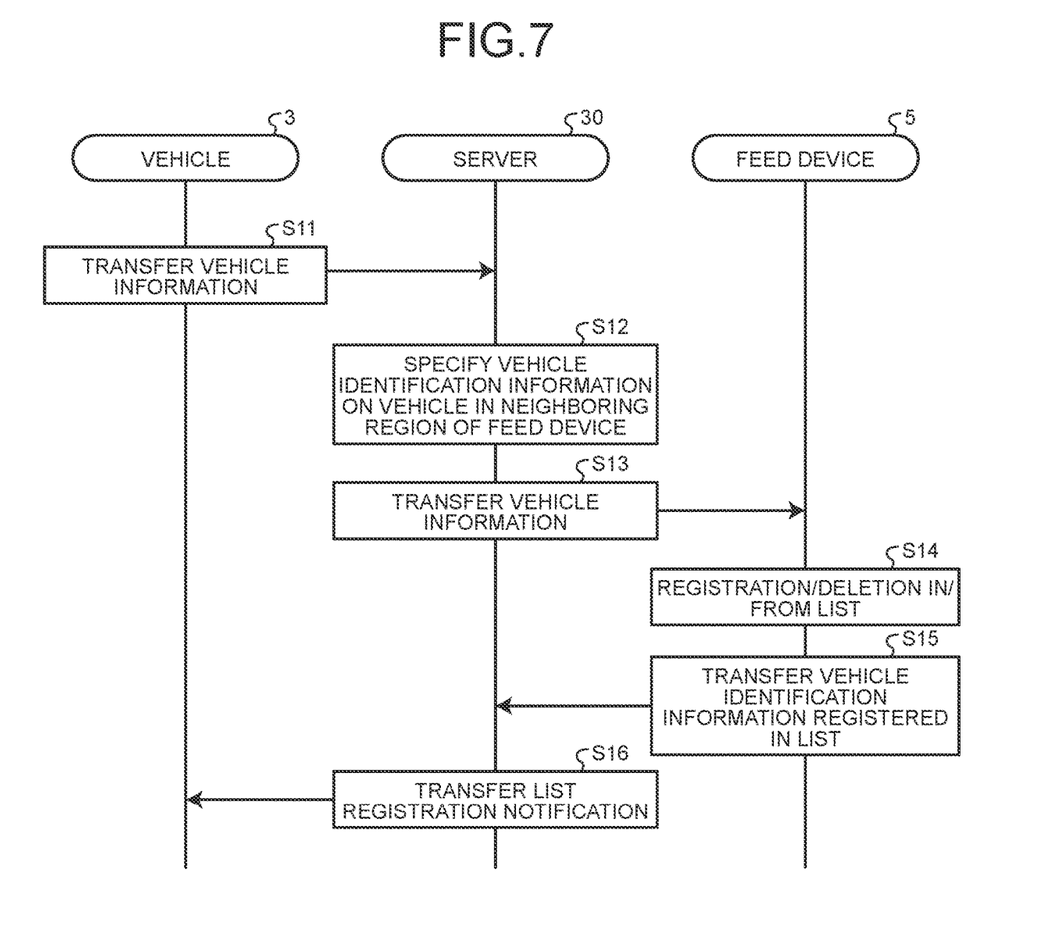
FIG. 7 is a sequence diagram illustrating a case where communication using the wide-area wireless communication is performed between a vehicle and a feed device.

The vehicle ECU 330 starts the Communication setup/Request D-WPT service A60. The vehicle ECU 330 starts the wide-area wireless communication in the Communication setup/Request D-WPT service A60. First, when the vehicle 3 transitions from the Preparation A50 to the Communication setup/Request D-WPT service A60, the third communication device 340 transfers a signal for the Request D-WPT service. The third communication device 340 wirelessly communicates with the first communication device 120 that supports a D-WPT lane which the vehicle 3 is scheduled to enter or has entered. The first communication device 120 of a communication target is selected based on the relative positional relation between the current position of the vehicle 3 and the position of the D-WPT lane. On the side of the feed device 5, when the first communication device 120 receives a signal for the Request D-WPT service in the state of Waiting for the D-WPT service request A30, the state transitions to the Communication setup/Request D-WPT service A60. Various pieces of information of the wide-area wireless communication and P2PS communication are linked by using the vehicle identification information. FIG. 7 illustrates a processing sequence of the Communication setup/Request D-WPT service A60.

FIG. 7 is a sequence diagram illustrating a case where communication using the wide-area wireless communication is performed between the vehicle and the feed device. The vehicle 3 transfers vehicle information to the server 30 (Step S11). In Step S11, the third communication device 340 of the vehicle 3 transfers the vehicle information to the server 30. The vehicle information includes vehicle identification information, various parameters of the power reception device 20, information on the current position of the vehicle 3, and requested power. The vehicle ECU 330 calculates the requested power based on the state of charge (SOC) of the battery 320. In Step S11, the vehicle ECU 330 causes the third communication device 340 to transfer the vehicle information at predetermined intervals. The predetermined intervals are set in accordance with the distance from the current position of the vehicle 3 to the start point of the WPT lane. The predetermined intervals are shortened as the distance from the vehicle 3 to the start point of the WPT lane is shortened.

When receiving the vehicle information from the vehicle 3, the server 30 specifies the vehicle identification information on the vehicle 3 located in a neighboring region of the feed device 5 based on the information on the current position of the vehicle 3 included in the vehicle information (Step S12). In Step S12, the server 30 specifies the vehicle 3 located in a predetermined neighboring region from the feed device 5 based on the information on the current position of the vehicle 3 and information on the position of the feed device 5. A region within, for example, 500 meters is set as the neighboring region.

When specifying the vehicle identification information on the vehicle 3, the server 30 transfers the vehicle information to the feed device 5 (Step S13). In Step S13, a transfer device of the server 30 transfers the vehicle information to the feed device 5.

When receiving the vehicle information from the server 30, the feed device 5 registers/deletes the vehicle identification information in/from an identification information list (Step S14). In Step S14, the power transfer ECU 110 registers/deletes the vehicle identification information in/from the identification information list such that the vehicle identification information associated with the vehicle information is registered in the identification information list without excess and deficiency.

When registering/deleting the vehicle identification information in/from the identification information list, the feed device 5 transfers the vehicle identification information registered in the identification information list to the server 30 (Step S15). In Step S15, the first communication device 120 of the feed device 5 transfers the vehicle identification information to the server 30.

Then, when receiving the vehicle identification information from the feed device 5, the server 30 transfers a list registration notification to the vehicle 3 corresponding to the vehicle identification information registered in the identification information list (Step S16). In Step S16, the communication device of the server 30 transfers the list registration notification to the vehicle 3. The list registration notification indicates that the vehicle identification information is registered in the identification information list, and includes identification information on the feed device 5 and position information on the feed device 5.

The state in which the vehicle 3 starts the wide-area wireless communication and both the feed device 5 and the vehicle 3 are in the state of the Communication setup/Request D-WPT service A60 indicates success of communication setup in the wide-area wireless communication. The success of communication setup causes the state to transition to the D-WPT service session A70.

Referring back to FIG. 6, in the D-WPT service session A70, power is transferred in a non-contact manner from the power-transfer-side resonance circuit 240 of the feed device 5 to the power-reception-side resonance circuit 410 of the vehicle 3 with communication connection being established between the feed device 5 and the vehicle 3. The D-WPT service session A70 starts with success of communication setup and terminates with termination of communication. In the state of the D-WPT service session A70, when communication is terminated, the state transitions to terminate the D-WPT service session A80.

In the Terminate D-WPT service session A80, the vehicle 3 terminates the wide-area wireless communication with the feed device 5. The vehicle 3 and the feed device 5 can receive a trigger for terminating the D-WPT service session A70. Then, the vehicle ECU 330 prevents D-WPT from being started for the secondary device 22 and the vehicle 3 until the third communication device 340 receives the next notification (signal for Request D-WPT service).

Detailed activities of the D-WPT service session A70 will now be described.

The D-WPT service session A70 includes Compatibility check/Service authentication A110; Fine Positioning A120; Pairing/Alignment check A130; Magnetic Coupling Check A140; Perform Power Transfer A150; Stand-by A160; and Power transfer terminated A170.

The Compatibility check/Service authentication A110 will be described. After the success of communication setup, the vehicle ECU 330 and the power transfer ECU 110 confirm that the primary device 13 and the secondary device 22 have compatibility. Compatibility check is performed on the side of the feed device 5 based on information associated with vehicle identification information acquired by communication. Check items include the minimum ground clearance of the secondary device 22, the shape type of the secondary device 22, circuit topology of the secondary device 22, the self-resonance frequency of the secondary device 22, and the number of the secondary coils 21.

In the Compatibility check/Service authentication A110, the vehicle 3 first transfers compatibility information of the power reception device 20 from the third communication device 340 to the feed device 5. The first communication device 120 of the feed device 5 receives the compatibility information of the power reception device 20 from the vehicle 3. Then, the first communication device 120 of the feed device 5 transfers the compatibility information of the power transfer device 10 to the vehicle 3. The third communication device 340 of the vehicle 3 receives the compatibility information of the power transfer device 10 from the feed device 5.

Elements of the compatibility information transferred by the vehicle 3 to the feed device 5 include vehicle identification information, WPT power classes, an air gap class, WPT operating frequencies, WPT frequency adjustment, a WPT type, WPT circuit topology, a fine positioning method, a pairing method, an alignment method, and information on the presence or absence of a power adjustment function.

Elements of the compatibility information transferred by the feed device 5 to the vehicle 3 include feed device identification information, WPT power classes, an air gap class, WPT operating frequencies, WPT frequency adjustment, a WPT type, WPT circuit topology, a fine positioning method, a pairing method, an alignment method, and information on the presence or absence of a power adjustment function.

Each element name will be described in detail. Note that each element of the compatibility information transferred from the vehicle 3 to the feed device 5 will be described. Description of compatibility information overlapping the compatibility information transferred from the vehicle 3 to the feed device 5 among pieces of compatibility information transferred from the feed device 5 to the vehicle 3 will be omitted.

The gap class is information indicating an air gap class in which the secondary device 22 can receive power. The WPT power class is information indicating a power class in which the secondary device 22 can receive power. The WPT operating frequency is information indicating a frequency of received power received by the secondary device 22. The WPT frequency adjustment is information indicating whether the operating frequency can be adjusted. The WPT type is information indicating the shape type of the secondary device 22, and indicates a coil shape of the secondary coil 21. A circle and a solenoid indicate the WPT type. The WPT circuit topology is information indicating a structure of connection between the secondary coil 21 and the resonance capacitor. The WPT circuit topology includes series and parallel. The fine positioning method is information indicating how positioning is performed at the time when the positioning is performed. In the pairing method, pairing for the vehicle 3 to specify the feed device 5 is performed. In the alignment method, the relative positions of the secondary device 22 and the primary device 13 are confirmed before the start of power transfer.

The Fine Positioning A120 will be described. The vehicle 3 performs the Fine Positioning A120 prior to the Pairing/Alignment check A130 or in parallel with these activities. When determining that the vehicle 3 has approached or entered the region (WPT lane) where the feed device 5 is installed, the vehicle ECU 330 starts the Fine Positioning A120.

The vehicle ECU 330 guides the vehicle 3 to align the primary device 13 and the secondary device 22 within a range in which sufficient magnetic coupling for wireless power transfer is established.

The Fine Positioning A120 is manually or automatically performed basically on the side of the vehicle 3. In the Fine Positioning A120, cooperation with an automated driving assistance system (ADAS) is possible.

Then, the activities of the Fine Positioning A120 continues until the vehicle 3 leaves the D-WPT charging site or the state changes to communication termination, and can be executed based on alignment information transferred from the feed device 5 to the vehicle 3 by the wide-area wireless communication. This communication termination means the Terminate D-WPT service session A80.

The Pairing/Alignment check A130 will be described. Here, Pairing and Alignment check will be separately described.

Pairing will be described. A P2PS interface that performs the narrow-area wireless communication ensures that the primary device 13 and the secondary device 22 are uniquely paired. A process of a pairing state is as follows.

First, the vehicle ECU 330 recognizes that the vehicle 3 has approached or entered the D-WPT lane. For example, the vehicle ECU 330 has map information containing the D-WPT lane. The vehicle ECU 330 compares the map information with position information on the vehicle itself obtained by the GPS receiver 360, and recognizes the approach or entry based on a linear distance. The vehicle 3 transfers which D-WPT lane the vehicle 3 has approached to the server 30 by the wide-area wireless communication. In short, the third communication device 340 notifies a cloud of a signal indicating which D-WPT lane the vehicle 3 has approached. Moreover, when the vehicle ECU 330 recognizes that the vehicle 3 has approached or entered the D-WPT lane, the fourth communication device 350 starts transferring modulated signals at regular intervals for pairing the primary device 13 and the secondary device 22.

Furthermore, the feed device 5 may recognize that the vehicle 3 has approached or entered the D-WPT lane by using information acquired from the server 30 by the wide-area wireless communication. The server 30 allocates vehicle identification information on the vehicle 3 approaching each D-WPT lane to the feed device 5 supporting the lane. Since the feed device 5 is only required to refer to pieces of vehicle identification information the number of which has been reduced by the server 30, authentication processing can be performed in a short time. When the feed device 5 recognizes that the vehicle 3 is approaching the D-WPT lane, the second communication device 130 enters a stand-by mode. In the stand-by mode, the second communication device 130 waits for reception of the modulated signals from the fourth communication device 350 of the vehicle 3. The modulated signals include vehicle identification information.

When the second communication device 130 receives the modulated signals from the vehicle 3, the feed device 5 compares the vehicle identification information received by the narrow-area wireless communication with vehicle identification information in the identification information list obtained as a result of the wide-area wireless communication with a plurality of vehicles 3 heading for the D-WPT lane. By this comparison, the feed device 5 identifies the vehicle 3.

When recognizing that the vehicle 3 is outside the D-WPT lane, the vehicle ECU 330 stops transferring the modulated signals from the fourth communication device 350. The vehicle ECU 330 can determine whether the vehicle 3 has passed through the D-WPT lane based on the map information and the position information on the vehicle itself.

When determining that the vehicle 3 is not traveling on the D-WPT lane or when determining that the vehicle 3 is not approaching the D-WPT lane, the feed device 5 stops waiting for the modulated signals from the fourth communication device 350.

Pairing is performed on the primary device 13 until the vehicle 3 exits the D-WPT charging site or the state changes to communication termination. When Pairing is completed, the state transitions to Alignment check.

The Alignment check will be described. The Alignment check is intended to confirm that the lateral distance between the primary device 13 and the secondary device 22 is within an acceptable range. The Alignment check is performed by using the narrow-area wireless communication (P2PS).

The Alignment check is continuously executed based on the P2PS until the vehicle 3 leaves the D-WPT charging site or the state changes to communication termination. The result of Alignment check can be transferred from the first communication device 120 to the third communication device 340 by the wide-area wireless communication.

The Magnetic Coupling Check A140 will be described. In the Magnetic Coupling Check A140, the feed device 5 confirms the magnetic coupling state, and confirms that the secondary device 22 is within an acceptable range. When Magnetic Coupling Check A140 is terminated, the state transitions to Perform Power Transfer A150.

The Perform Power Transfer A150 will be described. In this state, the feed device 5 transfers power to the power reception device 20. The power transfer device 10 and the power reception device 20 need to have ability to control transfer power (transferred power and received power) for the usefulness of MF-D-WPT and protection of the power reception device 20 and the battery 320. Larger power transfer helps to lengthen a movement distance without static wireless charging and conductive charging of the power reception device 20. The capacity of the battery 320, however, varies depending on the type of the vehicle 3. A demand for operating power may rapidly fluctuate. The rapid fluctuation includes a sudden regenerative brake. When the regenerative brake is applied during traveling on the D-WPT lane, the regenerative brake is prioritized. In addition to regenerative power, received power from the power reception device 20 is thus fed to the battery 320. In this case, the power reception device 20 is required to adjust the transfer power for protecting the battery 320 from overcharge.

In this state, communication is not newly started between the feed device 5 and the power reception device 20 despite the necessity of power control. This is because communication can impair response and accuracy in the power control due to instability and latency thereof. Therefore, the feed device 5 and the power reception device 20 perform power transfer and control thereof based on known information up to this state.

The feed device 5 increases transfer power of Magnetic Coupling Check in response to a power request transferred from the third communication device 340 by preliminarily using the wide-area wireless communication. The feed device 5 keeps fluctuations of current and voltage within ranges thereof, and attempts to maximize power transferred during transition.

The power reception device 20 receives transferred power from the power transfer device 10 basically without any control. The power reception device 20, however, starts control when transferred power, such as the rated power of the battery 320, exceeds or is about to exceed a limit. The rated power fluctuates in accordance with a charge state and a demand for operating power of the vehicle 3. Furthermore, in the power control in the vehicle ECU 330, coping with a malfunction in the wide-area wireless communication is required. The malfunction leads to a contradiction between a power control target in the primary device 13 and a request from the third communication device 340, and sudden failures of the power reception device 20 and the battery 320 during power transfer. The power reception device 20 controls power transferred under a power request rate of which the power reception device 20 is notified by the first communication device 120.

The power request is determined based on compatibility check information such as the WPT circuit topology, geometry, ground clearance, and electromagnetic compatibility (EMC) of the vehicle 3 and the primary device 13. The magnetic field differs depending on these specifications, and power transfer within a range satisfying the EMC is necessary.

Power control in the power transfer ECU 110 and the power reception device 20 may interfere with each other. The interference may occur, in particular, when the feed device 5 attempts to request power larger than the latest power limit in the power reception device 20 by the wide-area wireless communication. Examples of this case include rapid regenerative control in a relatively small battery 320 in the vehicle 3. If possible, it is desirable that the feed device 5 can detect a mismatch between a power source control target and a limit and adjust power transfer to eliminate the mismatch.

The state transitions to the Stand-by A160 when power transfer is interrupted for a short period while the secondary device 22 is still located on the primary device 13, for example, when the foreign object detection device 140 detects a foreign object on the primary device 13, or when magnetic coupling is reduced by poor alignment of the secondary device 22. Note that, when the vehicle 3 has the foreign object detection device, a foreign object may be detected on the side of the vehicle 3.

When the secondary device 22 passes over the primary device 13, the state transitions to the Power transfer terminated A170. In this case, the magnetic coupling between the two devices is weakened, which reduces the transferred power. The feed device 5 can detect that the magnetic coupling is weakened by monitoring the transfer power. The feed device 5 thus basically determines state transition to the Power transfer terminated A170, and then starts lowering voltage for stopping the power transfer.

The Stand-by A160 will be described. In this state, when the power transfer is interrupted for a short time for some reason, and both the vehicle 3 and the feed device 5 are ready for the D-WPT, the state returns to the Perform Power Transfer A150. When the power transfer may be interrupted, the state transitions to the Stand-by A160.

Figure 8:
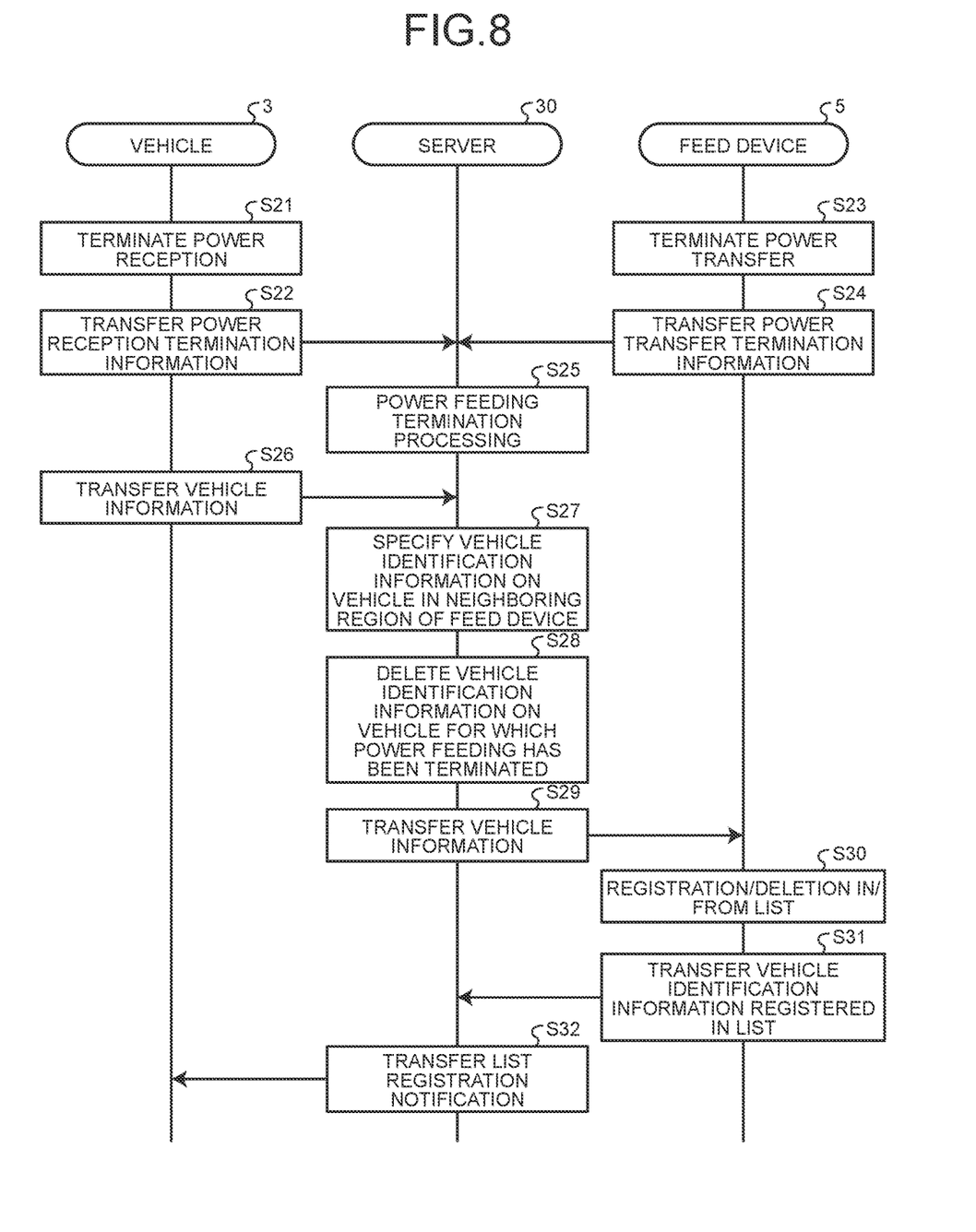
FIG. 8 is a sequence diagram illustrating an operation after power feeding during traveling from the feed device to the vehicle is terminated.

The Power transfer terminated A170 will be described. In this state, the feed device 5 reduces the transferred power to zero, and holds or uploads power transfer result data, such as total transfer power, power transfer efficiency, and a failure history. Each piece of data is tagged with vehicle identification information. Finally, the feed device 5 deletes vehicle identification information on the vehicle 3 that has passed through the D-WPT lane. This enables the feed device 5 to prepare for pairing and power transfer to be later performed on another vehicle. FIG. 8 illustrates a processing sequence of the Power transfer terminated A170.

FIG. 8 is a sequence diagram illustrating an operation after power feeding during traveling from the feed device to the vehicle is terminated. When power reception from the feed device 5 is terminated in the power reception device 20 of the vehicle 3 (Step S21), the vehicle 3 transfers power reception termination information to the server 30 (Step S22). In Step S22, the power reception termination information is transferred from the third communication device 340 of the vehicle 3. The power reception termination information includes, for example, vehicle identification information on the vehicle 3, received power from the feed device 5, power reception efficiency, and an abnormality detection result as information on power reception from the feed device 5.

When the processing of Step S21 is performed, the feed device 5 terminates power transfer to the vehicle 3 (Step S23). The processing of Step S21 and the processing of Step S23 may be simultaneously performed, but are not required to be simultaneously performed. When the processing of Step S23 is performed, the feed device 5 transfers power transfer termination information to the server 30 (Step S24). In Step S24, the power transfer termination information is transferred from the first communication device 120 of the feed device 5.

When receiving power reception termination information from the vehicle 3 and receiving power transfer termination information from the feed device 5, the server 30 performs power feeding termination processing of terminating power feeding from the feed device 5 to the vehicle 3 (Step S25). In the power feeding termination processing, processing of calculating an amount of power fed from the feed device 5 to the vehicle 3 based on the power reception termination information and the power transfer termination information and processing of charging a user of the vehicle 3 based on the calculated amount of fed power are performed.

Furthermore, the vehicle 3 transfers vehicle information to the server 30 regardless of the power feeding termination processing (Step S26). In Step S26, the vehicle information is transferred from the third communication device 340 of the vehicle 3.

When receiving the vehicle information from the vehicle 3 after performing the power feeding termination processing, the server 30 specifies the vehicle identification information on the vehicle 3 located in a neighboring region of each feed device 5 based on the vehicle information (Step S27).

Then, when the power feeding termination processing on a certain vehicle 3 has already been performed in a certain feed device 5, the server 30 deletes vehicle identification information on the vehicle 3 on which the power feeding termination processing has already been performed from pieces of vehicle identification information on vehicles 3 in a neighboring region of the certain feed device 5 specified in the processing of Step S27 (Step S28).

Thereafter, the server 30 transfers, to each feed device 5, vehicle information associated with vehicle identification information that has not been deleted in the processing of Step S28 among pieces of vehicle identification information on the vehicle 3 specified to be located in a neighboring region of each feed device 5 (Step S29).

When the feed device 5 receives vehicle information from the server 30 after the vehicle information is transferred to each feed device 5 in the processing of Step S29, the feed device 5 registers/deletes vehicle identification information in/from the identification information list (Step S30). The processing of Step S30 is similar to the processing of Step S14 in FIG. 7. Thereafter, the feed device 5 transfers the vehicle identification information registered in the identification information list to the server 30 (Step S31). The processing of Step S31 is similar to the processing of Step S15 in FIG. 7.

Then, when receiving the vehicle identification information from the feed device 5, the server 30 transfers a list registration notification to the vehicle 3 corresponding to the vehicle identification information registered in the identification information list (Step S32). The processing of Step S32 is similar to the processing of Step S16 in FIG. 7.

As a result, when the processing in FIG. 8 is performed, vehicle identification information on the vehicle 3 has been registered in the identification information list. The vehicle 3 is located in a neighboring region of each feed device 5. In the vehicle 3, power feeding from the feed device 5 is not terminated, and a request for deleting vehicle identification information has not been made. Then, when the vehicle identification information on the vehicle 3 has been registered in any of identification information lists of the feed device 5, the vehicle 3 receives a list registration notification. Thus, the vehicle ECU 330 can determine that the vehicle itself has been registered in any feed device 5 by receiving the list registration notification. Then, when the vehicle 3 goes out of the neighboring region of the feed device 5, the vehicle identification information on the vehicle 3 is deleted from the identification information list of the feed device 5.

The description returns to FIG. 6. Furthermore, in the Power transfer terminated A170, the power reception device 20 is not required to do anything for setting the transfer power to zero. The P2PS interface is kept active when the vehicle 3 is on the D-WPT lane. The state of the power reception device 20 automatically transitions to Pairing for power transfer from the next primary device 13. As illustrated by a transition line in FIG. 6, the state transitions from the Power transfer terminated A170 to the Pairing/Alignment check A130. As illustrated in FIG. 6, satisfying a predetermined transition condition enables the transition from the Magnetic Coupling Check A140 to the Pairing/Alignment check A130 and the transition from the Perform Power Transfer A150 to the Pairing/Alignment check A130. Pairing may be individually performed on a plurality of primary coils 11, or may be performed on a representative point obtained by bundling the plurality of primary coils 11.

Then, when there is no D-WPT request from the vehicle ECU 330 or when a series of states from the Communication setup/Request D-WPT service A60 to the Power transfer terminated A170 is prohibited, the D-WPT service session A70 transitions to the Terminate D-WPT service session A80, and the wide-area wireless communication between the first communication device 120 and the third communication device 340 is stopped. For example, the D-WPT is stopped when the charge state of the battery 320 is too high or when the power reception device 20 is too hot due to continuous power transfer. Such unnecessary D-WPT can be disabled simply by deactivating the P2PS interface. The power transfer ECU 110, however, can release a memory occupied for the vehicle 3 without requiring the D-WPT by stopping the wide-area wireless communication and terminating the established wide-area wireless communication.

Furthermore, the D-WPT service session A70 is not limited to the transitions as indicated by the transition lines in FIG. 6. When a condition for the power transfer process stays in the D-WPT service session A70 is satisfied at the time when activities after the Pairing/Alignment check A130 are terminated in the D-WPT service session A70, transition to the Terminate D-WPT service session A80 is not made, and transition to the Compatibility check/Service authentication A110 is made. For example, when a predetermined transition condition is satisfied in the state of the Magnetic Coupling Check A140, the state can transition to the Compatibility check/Service authentication A110.

Control Device for Power Feeding During Traveling

A control device for power feeding during traveling according to the embodiment will be described with reference to the drawings. Specifically, the control device for power feeding during traveling according to the embodiment is achieved by the function of the feed device 5 described above in FIG. 2. Furthermore, the control device for power feeding during traveling according to the embodiment performs control to be described below in the D-WPT service session A70 of the power transfer process (D-WPT process) described above in FIG. 6.

Furthermore, in the control performed by the control device for power feeding during traveling according to the embodiment, the feed device 5 communicates with the server 30 by using the wide-area wireless communication. The server 30 holds, as an identification information list, identification information on the primary coil 11 of each feed facility 2 capable of feeding power to the vehicle 3, and manages the identification information.

Figure 9:
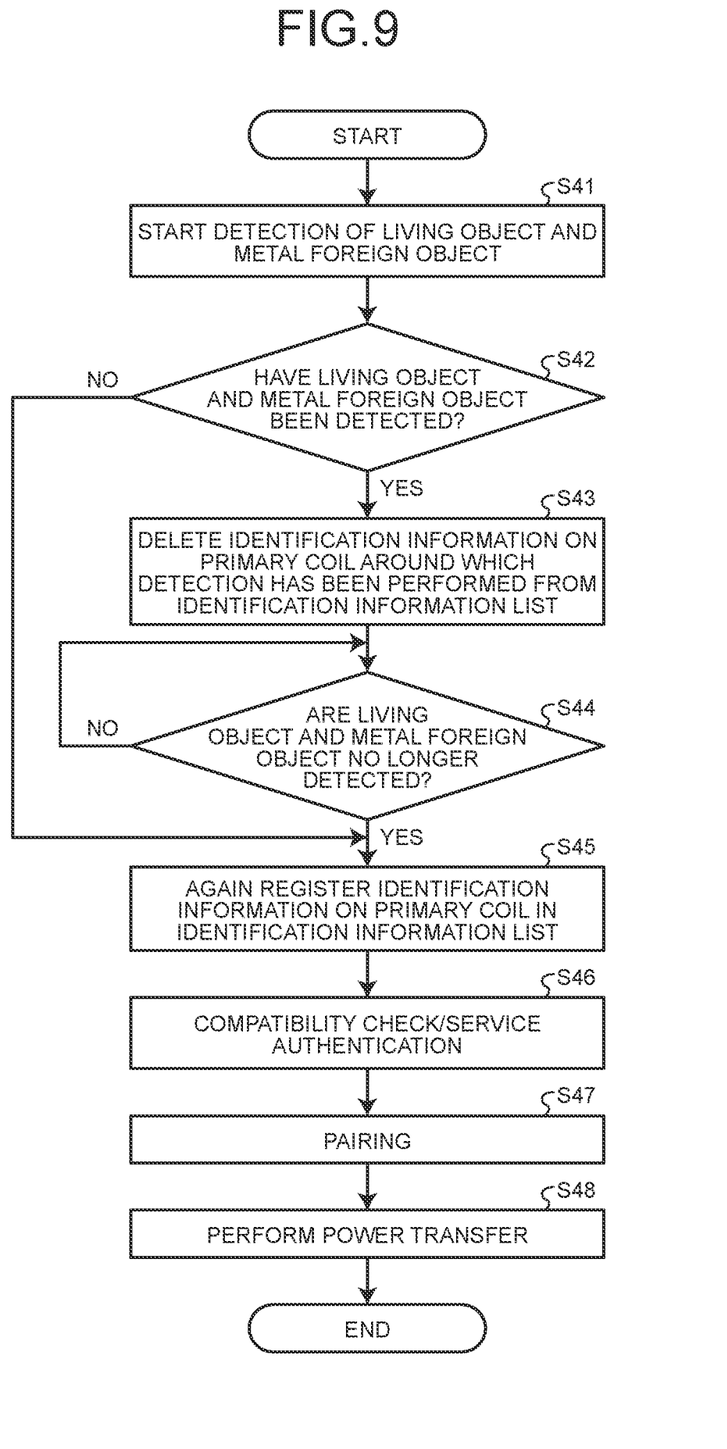
FIG. 9 is a flowchart illustrating a flow of processing executed by the control device for power feeding during traveling according to the embodiment.

Control executed by the control device for power feeding during traveling according to the embodiment will be described with reference to FIG. 9. Note that, mainly the power transfer ECU 110 of the feed device 5 performs control described with reference to the figure.

First, the foreign object detection device 140 of the feed device 5 starts detection of a living object and a metal foreign object around the primary coil 11 (Step S41). Subsequently, the power transfer ECU 110 of the feed device 5 determines whether the living object and the metal foreign object have been detected around the primary coil 11 with the foreign object detection device 140 (Step S42).

When it is determined that the living object and the metal foreign object have been detected around the primary coil (Yes in Step S42), the power transfer ECU 110 deletes the identification information on the primary coil 11 around which the living object and the metal foreign object have been detected from the identification information list of the server 30 (Step S43). In Step S43, the power transfer ECU 110 communicates with the server 30 through the first communication device 120, and transfers an instruction to delete the identification information on the primary coil 11 around which the living object and the metal foreign object have been detected (deletion instruction information). In response to the instruction, the server 30 deletes the corresponding identification information on the primary coil 11 from the identification information list.

Subsequently, the power transfer ECU 110 determines whether the living object and the metal foreign object are no longer detected around the primary coil 11 (Step S44). The situation in which the living object and the metal foreign object which have been once detected are no longer detected includes a case where the living object (e.g., human and another animal) leaves the primary coil 11, a case where the metal foreign object is blown off by wind or the like, and a case where the metal foreign object is removed by human power.

When it is determined that the living object and the metal foreign object are no longer detected around the primary coil 11 (Yes in Step S44), the power transfer ECU 110 again registers the identification information on the primary coil in the identification information list of the server 30 (Step S45). In Step S45, the power transfer ECU 110 communicates with the server 30 through the first communication device 120, and transfers an instruction to again register the identification information on the primary coil 11 around which the living object and the metal foreign object are no longer detected (registration instruction information). In response to the instruction, the server 30 registers the corresponding identification information on the primary coil 11 in the identification information list.

Subsequently, the power transfer ECU 110 performs, with the vehicle ECU 330, Compatibility check/Service authentication (Step S46). The Compatibility check/Service authentication in Step S46 are as described in A110 in FIG. 6. The presence or absence of compatibility is confirmed between the power transfer ECU 110 and the vehicle ECU 330 by compatibility information thereof being transferred and received.

Subsequently, when the Compatibility check/Service authentication are completed, the power transfer ECU 110 performs Pairing of the power reception device 20 and the power transfer device 10 (Step S47). The Pairing in Step S47 is as described in A130 in FIG. 6. That is, a modulated signal containing the vehicle identification information is transferred from the power reception device 20 to the power transfer device 10 by the narrow-area wireless communication. In response to the modulated signal, the power transfer device 10 identifies the vehicle 3 of a power transfer target by comparing vehicle identification information contained in the modulated signal with vehicle identification information preliminarily received by the wide-area wireless communication.

Subsequently, the power transfer ECU 110 performs power transfer from the power transfer device 10 to the power reception device 20 (Step S48), and completes the processing. The Perform Power Transfer in Step S48 is as described in A150 in FIG. 6. Note that, although not described here, more specifically, Alignment check and Magnetic Coupling Check are performed between Step S47 and Step S48.

According to the control device for power feeding during traveling according to the embodiment described above, it is possible to appropriately cope with a case where a living object or a metal foreign object is detected. That is, in the control device for power feeding during traveling according to the embodiment, when a living object or a metal foreign object is detected around the primary coil 11, the corresponding identification information on the primary coil 11 is deleted from the identification information list held by the server 30. This prevents power from being fed from the primary coil 11 around which a living object or a metal foreign object has been detected to the vehicle 3. In contrast, in the control device for power feeding during traveling according to the embodiment, when a living object or a metal foreign object is not detected around the primary coil 11, a shift to the step of the Compatibility check/Service authentication is made as usual.

Furthermore, in the control device for power feeding during traveling according to the embodiment, when a living object or a metal foreign object is removed from around the primary coil 11, the corresponding identification information on the primary coil 11 is again registered in the identification information list held by the server 30. Then, a shift to the step of Compatibility check/Service authentication is made as usual.

According to the present disclosure, it is possible to appropriately cope with a case where a living object or a metal foreign object is detected.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for power feeding during traveling comprising
a processor,
wherein, when a living object or a metal foreign object is detected around a primary coil of a power transfer device that transfers power to a power reception device of a vehicle that is traveling, the processor deletes identification information on the primary coil registered in an identification information list of the primary coil, and
when the living object or the metal foreign object is not detected, the processor performs compatibility check and service authentication between the power reception device of the vehicle and the power transfer device.

2. The control device for power feeding during traveling according to claim 1,
wherein, when the compatibility check and the service authentication are completed between the power reception device and the power transfer device, the processor performs pairing of the power reception device and the power transfer device, and transfers power from the power transfer device to the power reception device.

3. The control device for power feeding during traveling according to claim 1,
wherein, the living object or the metal foreign object is no longer detected from the primary coil around which the living object or the metal foreign object has been detected, the processor registers the identification information on the primary coil in the identification information list again.

* * * * *